May 8, 1928.　　　　　　　　　　　　　　　1,668,689
A. F. MASURY
VEHICLE HEATING SYSTEM
Filed June 25, 1925
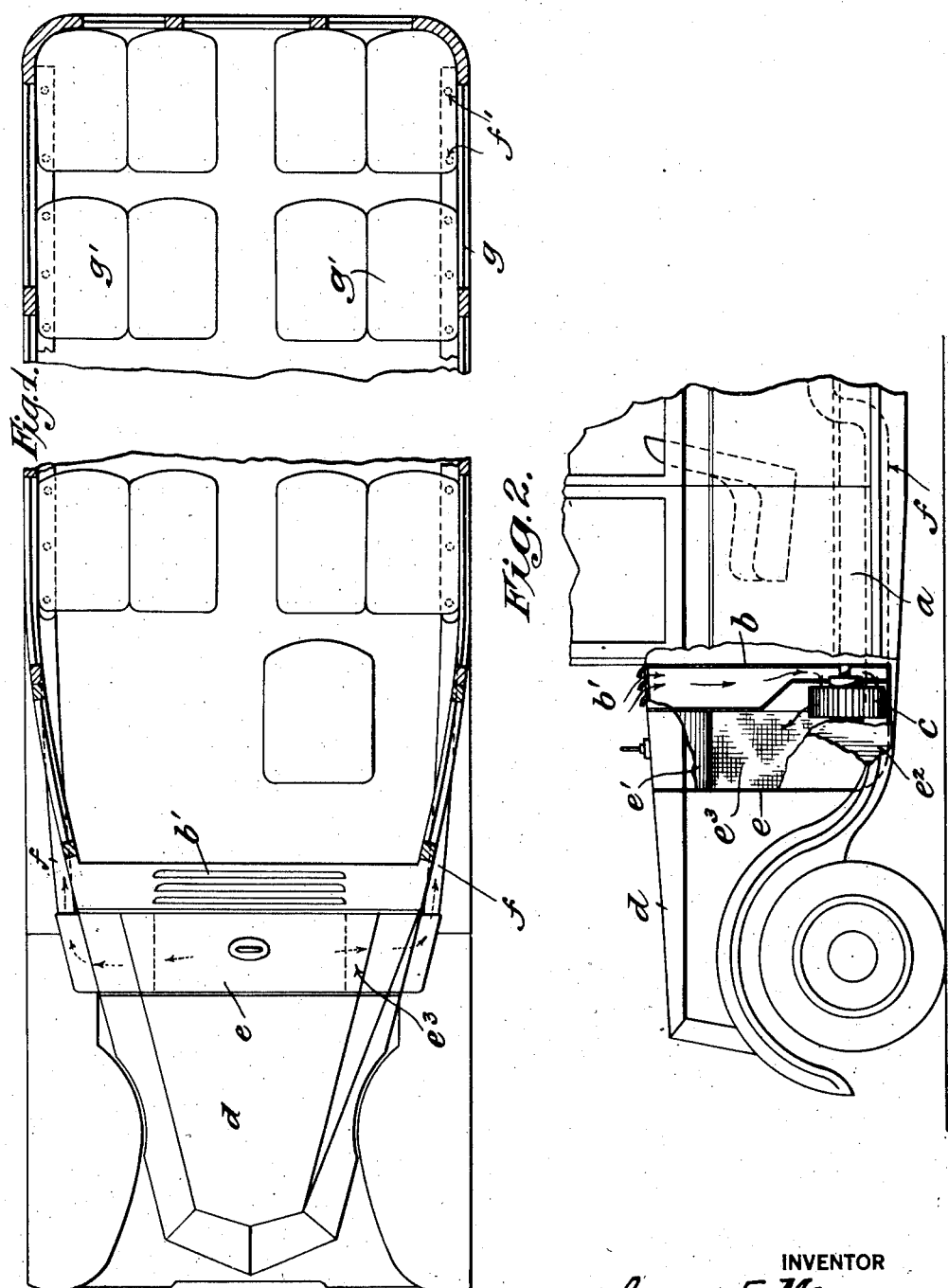
INVENTOR
ALFRED F. MASURY,
BY
Redding, Greeley, O'Shea + Campbell
his ATTORNEYS Patented May 8, 1928.

1,668,689

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

VEHICLE HEATING SYSTEM.

Application filed June 25, 1925. Serial No. 39,465.

This invention relates to a system for heating the enclosed bodies of motor vehicles and has particular reference to the utilization of the waste heat of the engine to effect such service. The invention seeks to effect the heating of the vehicle by means of the introduction of fresh warm air to the interior thereof. To this end the air from the radiator which has taken up heat from the cooling fluid for the motor is conducted to the interior of the vehicle. The invention has particular applicability to motor buses. In the preferred embodiment the dash of the bus is hollow and fresh air is drawn therewithin through the upper part of the dash by means of a fan disposed in the lower part of the vehicle body and preferably actuated from the motor. The fan forces the air upwardly in contact with the radiator tubes where a heat interchange takes place and from thence the air is drawn outwardly and downwardly to conduits extending along either side of the motor vehicle beneath the seats, suitable apertures being provided in the conduits to emit the warm fresh air into the interior of the bus.

In order that the invention may be clearly understood and readily carried into effect the same will now be described more fully with reference to the accompanying drawings illustrating a preferred embodiment thereof, in which:

Figure 1 is a plan view showing a motor bus to which the invention is applied.

Figure 2 is a fragmentary view showing the front end of the bus in side elevation, parts being removed in the interest of clearness.

Referring to the drawings the chassis frame $a$ is adapted to support a hollow dash $b$ formed with louvers $b'$ in the upper part thereof and communicating in the lowermost part with a fan $c$ which is preferably carried upon the fly-wheel of the motor which is not shown but which is covered by the hood $d$. The radiator is illustrated in general at $e$ and is formed of an upper tank section $e'$ and a lower tank section $e^2$ between which radiator tubes $e^3$ extend. The air drawn in by the fan $c$ is forced upwardly between the banks of radiator tubes $e^3$ from whence it passes outwardly therethrough and downwardly into conduits $f$ disposed upon either side of the bus body. These conduits extend rearwardly along either side of the bus body $g$ and preferably beneath the seats $g'$ and are provided with suitable spaced apertures $f'$ through which the warm air from the radiator escapes into the interior of the bus. Various changes of direction may be made in the conduits, of course, in the interest of convenience and depending upon the construction or layout of the bus.

It will thus be seen that a convenient means of conducting fresh warm air into the interior of the body of the vehicle is provided by the utilization of existing units.

The invention is not to be deemed limited to the application of a heating system to motor buses but is applicable in any situation in which the interior of the body is to be heated by previously warmed air.

What I claim is:

In combination with an enclosed motor vehicle body having a dash, a heating system for the body comprising, a vertically disposed duct immediately in front of the dash and communicating at its upper end with the outer air, a closed compartment immediately in front of said duct and contiguous thereto and communicating at its lower end with the lower end of the duct, conduits connected with the compartment at its upper end and leading into the interior of the vehicle body, means to cause air entering the duct at its upper end to flow downwardly through the duct and upwardly through the compartment, and through said conduits into the interior of the vehicle body, and means within the compartment to heat the air flowing therethrough.

This specification signed this 23rd day of June A. D. 1925.

ALFRED F. MASURY.